US008346090B2

(12) United States Patent
Ishikawa et al.

(10) Patent No.: US 8,346,090 B2
(45) Date of Patent: Jan. 1, 2013

(54) INFRARED COMMUNICATION SYSTEM, MOVABLE OBJECT, SUPPLY FACILITY, AND METHOD FOR INFRARED COMMUNICATION IN THE SAME

(75) Inventors: Ryusuke Ishikawa, Kariya (JP); Makoto Kawatsu, Hekinan (JP)

(73) Assignee: Denso Corporation, Kariya (JP)

( * ) Notice: Subject to any disclaimer, the term of this patent is extended or adjusted under 35 U.S.C. 154(b) by 366 days.

(21) Appl. No.: 12/798,230

(22) Filed: Mar. 30, 2010

(65) Prior Publication Data

US 2010/0247108 A1 Sep. 30, 2010

(30) Foreign Application Priority Data

Mar. 31, 2009 (JP) ................................ 2009-086704

(51) Int. Cl.
*H04B 10/22* (2006.01)

(52) U.S. Cl. ....................................... 398/114; 398/116

(58) Field of Classification Search ................. 398/114, 398/116

See application file for complete search history.

(56) References Cited

U.S. PATENT DOCUMENTS 5,272,350 A * 12/1993 Solari et al. .................. 250/551
2010/0276031 A1 11/2010 Saiki et al.

FOREIGN PATENT DOCUMENTS

DE 102005033854 * 1/2007
JP 2009-010682 1/2009

* cited by examiner

*Primary Examiner* — Leslie Pascal

(74) *Attorney, Agent, or Firm* — Harness, Dickey & Pierce, PLC

(57) ABSTRACT

A supply facility supplies fluid to a movable object through a feed pipe connected with a connection port of the movable object. A feed connector of the feed pipe is rotatable around its axis when the feed pipe is connected with the connection port. At least one of the feed pipe of the supply facility and the movable object has multiple infrared communication elements. When the feed connector of the feed pipe is connected with the connection port of the movable object, at least one of the infrared communication elements is communicable with an infrared communication device on the other side via an infrared communication, regardless of the rotation phase.

11 Claims, 3 Drawing Sheets

INFRARED COMMUNICATION SYSTEM, MOVABLE OBJECT, SUPPLY FACILITY, AND METHOD FOR INFRARED COMMUNICATION IN THE SAME

CROSS REFERENCE TO RELATED APPLICATIONS

This application is based on and incorporates herein by reference Japanese Patent Application No. 2009-86704 filed on Mar. 31, 2009.

FIELD OF THE INVENTION

The present invention relates to an infrared communication system, a movable object, and a supply facility. The present invention further relates to a method for performing an infrared communication in the same.

BACKGROUND OF THE INVENTION

In recent years, a fuel cell vehicle (FCV) has been developed. The FCV has a fuel cell to cause a chemical reaction of hydrogen and oxygen so as to generate electric energy. The FCV consumes the generated electric energy to activate a motor so as to obtain driving force of the vehicle. The FCV is connected with a feed pipe in a hydrogen station to supply hydrogen (fuel) to the FCV through the feed pipe. So as to efficiently charge hydrogen, it is desirable to charge high-pressure hydrogen to the FCV. However, in view of safety, monitoring of a temperature and a pressure of a hydrogen tank of the FCV is required when hydrogen is charged to the hydrogen tank. In addition, control of a supply pressure of hydrogen is required in the hydrogen station according to the monitored temperature and the monitored pressure when hydrogen is charged. Therefore, a communication system for transmitting a temperature and a pressure monitored by the FCV to the hydrogen station is needed. For example, such a communication system may employ an electric wave communication or an infrared communication (see JP-A-2009-10682).

In general, the directivity of an electric wave is low, and an electric wave may easily diffuse around. Therefore, when multiple FCVs perform an electric wave communication in a hydrogen station, interference may arise in the electric wave communication. On the other hand, the directivity of infrared ray is high. Accordingly, in an infrared communication system, the optic axis of an infrared communication device of the FCV needs to coincide with an infrared communication device of the hydrogen station so as to perform an infrared communication. The optic axis of an infrared communication device of the FCV is changed in dependence upon the position and the direction of the FCV. Therefore, it is hard to adjust the optic axis of the infrared communication device of the FCV to coincide with the optic axis of the infrared communication device of the hydrogen station.

SUMMARY OF THE INVENTION

In view of the foregoing and other problems, it is an object of the present invention to produce an infrared communication system, a movable object, and a supply facility, configured to perform a communication between the movable object and the supply facility while restricting interference in the communication. It is another object of the present invention to produce a method for performing an infrared communication in the infrared communication system.

According to one aspect of the present invention, an infrared communication system configured to perform an infrared communication between a movable object having a connection port and a supply facility for supplying fluid to the movable object through a feed pipe connectable with the connection port, the infrared communication system comprises a movable-object-side infrared communication device provided to the movable object. The infrared communication system further comprises a supply-facility-side infrared communication device provided to the feed pipe of the supply facility and configured to be located in a position in which the supply-facility-side infrared communication device is capable of communicating with the movable-object-side infrared communication device via an infrared communication when a feed connector of the feed pipe is connected with the connection port. A rotation phase of the feed connector of the feed pipe is variable around an axial direction when the feed pipe is connected with the connection port. At least one of the movable-object-side infrared communication device and the supply-facility-side infrared communication device includes a plurality of infrared communication elements. At least one of the plurality of infrared communication elements is in a communicable position in which the at least one of the plurality of infrared communication elements is capable of performing the infrared communication, regardless of the rotation phase.

According to one aspect of the present invention, a method for performing an infrared communication between a movable object and a supply facility, the supply facility being for supplying fluid to the movable object through a feed pipe of the supply facility, the feed pipe being connectable with a connection port of the movable object, a rotation phase of a feed connector of the feed pipe being variable around its axis when the feed pipe is connected with the connection port, the method comprises detecting at least one of a plurality of infrared communication elements, which is provided to one of the feed connector of the feed pipe and the movable object and communicable with an infrared communication device on an opposite side of the at least one of the plurality of infrared communication elements when the feed pipe is connected with the connection port. The method further comprises performing an infrared communication via the detected at least one of the plurality of infrared communication elements when the feed pipe is connected with the connection port, regardless of the rotation phase.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS

Embodiment

1. Overview of Infrared Communication System

Figure 1:
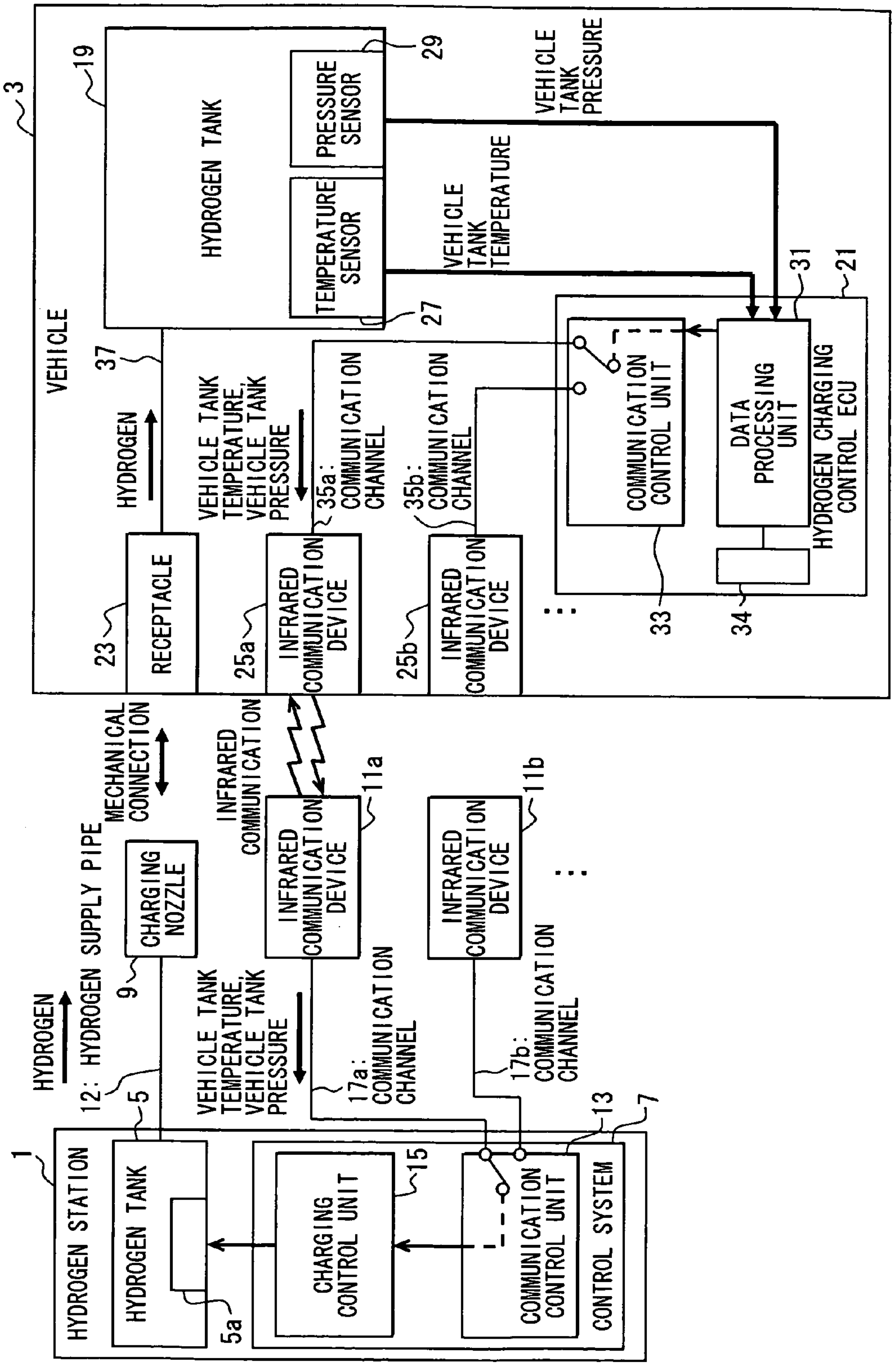
FIG. 1 is a block diagram showing a structure of a hydrogen station and a vehicle.

An overview structure of a hydrogen station (supply facility) 1 and a vehicle (movable object) 3 of an infrared communication system will be described with reference to FIG. 1. The hydrogen station 1 includes a hydrogen tank 5 for storing hydrogen (fluid), a control system 7 for controlling the hydrogen station 1, a charging nozzle (feed pipe, feed connector) 9, multiple infrared communication devices 11*a*, 11*b*, and the like. The number of the multiple infrared communication devices 11*a*, 11*b* may be two and may be a number greater than or equal to three, such as three, four, five, or six.

The hydrogen tank 5 includes a feed apparatus 5*a* for discharging hydrogen stored in the hydrogen tank 5 to the charging nozzle 9 through a hydrogen supply pipe (feed pipe) 12. The control system 7 includes a communication control unit 13 and a charging control unit 15. The communication control unit 13 is respectively connected with the multiple infrared communication devices 11*a*, 11*b*, and the like via communication channels 17*a*, 17*b* and the like. The communication control unit 13 has a function to select one of the communication channels 17*a*, 17*b*, and the like used for an infrared communication. The function will be described later in detail. The communication control unit 13 inputs a vehicle tank temperature and a vehicle tank pressure via the one of the communication channels 17*a*, 17*b*, and the like and outputs the vehicle tank temperature and the vehicle tank pressure to the charging control unit 15. The charging control unit 15 has a function to determine a pressure (hydrogen supply pressure) when the feed apparatus 5*a* supplies hydrogen based on the vehicle tank temperature and the vehicle tank pressure inputted from the communication control unit 13.

The vehicle 3 being a fuel cell vehicle (FCV) includes a hydrogen tank 19 for storing hydrogen, a hydrogen charging control ECU 21 for controlling a communication with the vehicle 3, a receptacle (connection port) 23, and multiple infrared communication devices 25*a*, 25*b*, and the like. The number of the multiple infrared communication, devices 25*a*, 25*b* may be two and may be a number greater than or equal to three, such as three, four, five, or six.

The hydrogen tank 19 includes a temperature sensor 27 for detecting its temperature (vehicle tank temperature) and a pressure sensor 29 for detecting its pressure (vehicle tank pressure). The hydrogen charging control ECU 21 includes a data processing unit 31, a communication control unit 33, and a storage unit 34. The data processing unit 31 periodically obtains the vehicle tank pressure from the pressure sensor 29 and the vehicle tank temperature from the temperature sensor 27. The data processing unit 31 outputs the obtained vehicle tank temperature and the obtained vehicle tank pressure to the communication control unit 33. The communication control unit 33 is respectively connected with the multiple infrared communication devices 25*a*, 25*b*, and the like via communication channels 35*a*, 35*b* and the like. The communication control unit 33 has a function to select one of the communication channels 35*a*, 35*b*, and the like used for the infrared communication. The function will be described later in detail. The communication control unit 33 is configured to transmit the vehicle tank temperature and the vehicle tank pressure to either one of the multiple infrared communication devices 11*a*, 11*b*, and the like via the infrared communication using the selected one of the communication channel 35*a*, 35*b*, and the like. The storage unit 34 is configured to store various data.

The receptacle 23 is provided to the exterior of the body of the vehicle 3 and mechanically connectable with the charging nozzle 9. The receptacle 23 has an inner portion connectable with the hydrogen tank 19 through a hydrogen supply pipe 37. Hydrogen is supplied to the receptacle 23 through the charging nozzle 9, and the hydrogen is fed into the hydrogen tank 19 through the hydrogen supply pipe 37. The vehicle 3 further has a generally-known structure as a FCV.

2. Structure of Charging Nozzle 9 and Receptacle 23

Figure 2A:
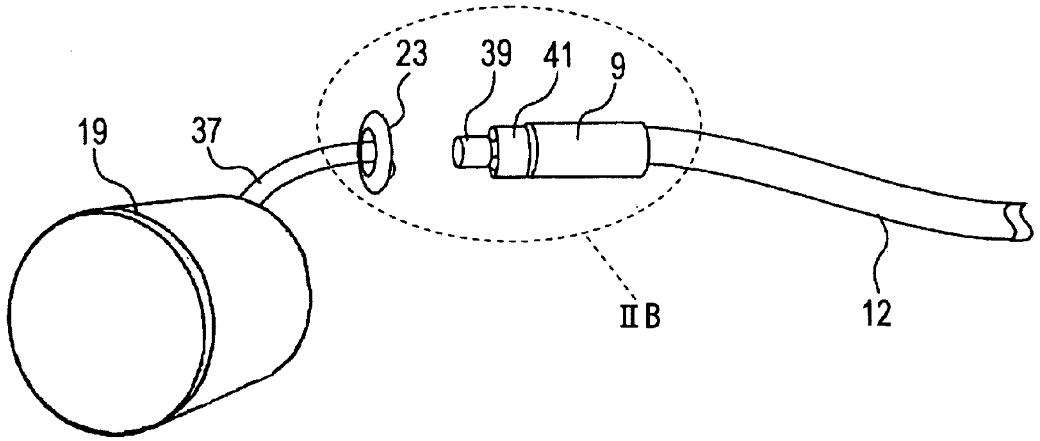
FIGS. 2A, 2B are schematic perspective views each showing a structure around a charging nozzle of the hydrogen station and a receptacle of the vehicle.
Figure 2B:
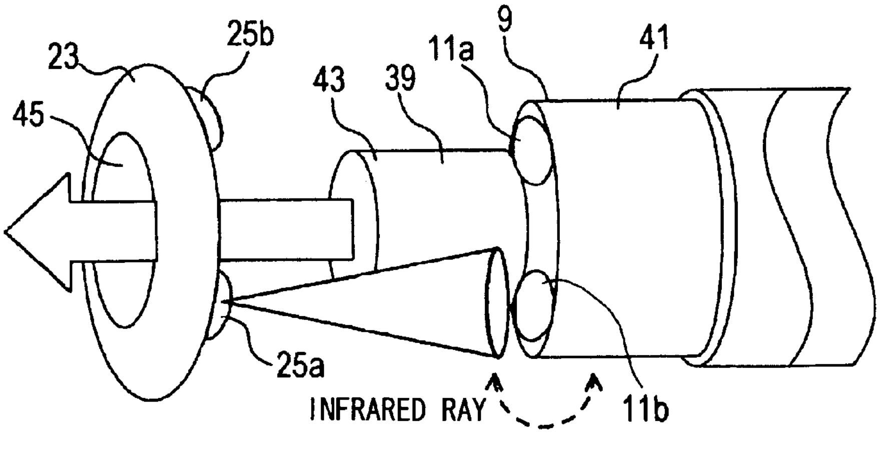

Subsequently, a structure around the charging nozzle 9 and the receptacle 23 will be described further in detail with reference to FIGS. 2A, 2B. The charging nozzle 9 is provided at a tip end of the hydrogen supply pipe 12. The charging nozzle 9 includes an inner pipe 39 and an outer pipe 41, which are coaxial with each other. The inner pipe 39 has a hollow space as a supply passage of hydrogen. The inner pipe 39 and the outer pipe 41 therebetween define a hollow space provided with the multiple infrared communication devices 11*a*, 11*b*, and the like. The multiple infrared communication devices 11*a*, 11*b*, and the like are arranged along the outer circumferential periphery of the inner pipe 39 at a regular interval, for example. The multiple infrared communication devices 11*a*, 11*b*, and the like are arranged in a direction to enable infrared communication along the axial direction of the charging nozzle 9 shown by the solid arrow in FIG. 2B. The inner pipe 39 has a projection 43 having a tip end projected beyond the outer pipe 41. The multiple infrared communication devices 11*a*, 11*b*, and the like, which are configured to communicate with the communication channel 17*a*, 17*b*, and the like, are also accommodated in the hollow space between the inner pipe 39 and the outer pipe 41 (unillustrated in FIGS. 2A, 2B). Similarly to the charging nozzle 9, the hydrogen supply pipe 12 includes an inner pipe and an outer pipe. The inner pipe of the hydrogen supply pipe 12 defines a supply path of hydrogen. The communication channel 17*a*, 17*b*, and the like are accommodated in a hollow space between the inner pipe and the outer pipe.

The receptacle 23 is a doughnut-shape member having a circular hole 45 at the center. The diameter of the hole 45 is slightly greater than the outer diameter of the inner pipe 39 and smaller than the outer, diameter of the outer pipe 41. Therefore, only the projection 43 of the inner pipe 39 can be inserted in the hole 45. The multiple infrared communication devices 25*a*, 25*b*, and the like are located on the lateral surface of the receptacle 23 and arranged along the hole 45. The multiple infrared communication devices 25*a*, 25*b*, and the like are arranged along the periphery of the hole 45 at a regular interval, for example. The multiple infrared communication devices 25*a*, 25*b*, and the like are arranged to enable infrared communication along a direction perpendicular to a main surface of the receptacle 23, i.e., in an opposite direction to the solid arrow in FIG. 2B. The projection 43 of the charging nozzle 9 is inserted into the hole 45 of the receptacle 23 and mechanically connectable with the receptacle 23. The charging nozzle 9 can supply hydrogen to the receptacle 23 in this state. When the charging nozzle 9 is connected to the receptacle 23, as described above, the position of the charging nozzle 9 and the direction of the axis of the charging nozzle 9 are substantially uniquely determined, since the diameter of the hole 45 is slightly greater than the outer diameter of the projection 43. It is noted that, even when the charging nozzle 9 is connected with the receptacle 23, the charging nozzle 9 is rotatable in the direction shown by the dotted arrow around its axis in FIG. 2B. Thus, a rotation phase of the charging nozzle 9 is variable. When the charging nozzle 9 is connected to the receptacle 23 in this way, the section of the outer pipe 41, which accommodates the multiple infrared communication devices 11*a*, 11*b*, and the like at the side of its tip end, is opposed to a portion of the lateral surface of the receptacle 23, on which the multiple infrared communication devices 25*a*, 25*b*, and the like are located. The multiple infrared communication devices 11a, 11b, and the like and the multiple infrared communication devices 25a, 25b, and the like are arranged such that at least one of the multiple infrared communication devices 11a, 11b, and the like is opposed to either of the multiple infrared communication devices 25a, 25b, and the like to enable an infrared communication at any rotation phase of the charging nozzle 9. For example, in the example shown in FIGS. 2A, 2B, the infrared communication device 11b and the infrared communication device 25a are in a physical relationship to enable an infrared communication therebetween. The charging nozzle 9 may be rotated from the present state. Consequently, an infrared communication between the infrared communication device 11b and the infrared communication device 25a may be disabled. Even in this condition, an infrared communication is certainly enabled in another combination between, for example, the infrared communication device 11a and the infrared communication device 25a.

Each infrared communication device is configured to emit infrared ray in a constant spread range to have a specific communication range. Accordingly, each infrared communication device need not be exactly coaxial with an opposed infrared device to enable an infrared communication. Even when a communication range of each infrared communication device is narrow, an infrared communication can be enabled, regardless of the rotation phase of the charging nozzle 9, by increasing the number of the infrared communication devices to reduce the distance between adjacent infrared devices. On the contrary, when a communication range of each infrared communication device is wide, the number of the infrared communication devices may be small.

3. Method of Infrared Communication

Subsequently, a method for transmitting the vehicle tank temperature and the vehicle tank pressure from the vehicle 3 to the hydrogen station 1 via an infrared communication will be described. As described above, the data processing unit 31 of the vehicle 3 periodically obtains the vehicle tank temperature and the vehicle tank pressure. The communication control unit 33 of the vehicle 3 detects one of the multiple infrared communication devices 25a, 25b, and the like, which is in a position to be communicable via an infrared communication. Specifically, the communication control unit 33 performs a negotiation with the one of the multiple infrared communication devices 25a, 25b. That is, the communication control unit 33 and the one of the multiple infrared communication devices 25a, 25b exchange data (test data) for test in a condition where only one of the multiple infrared communication devices 25a, 25b, and the like is activated (turned ON). The communication control unit 33 repeats the negotiation while switching the one activated infrared communication device. In the state shown in FIG. 1, only the communication channel 35a among the multiple communication channels 35a, 35b, and the like is connected with the communication control unit 33, and only the infrared communication device 25a among the multiple infrared communication devices 25a, 25b, and the like is activated. Consequently, the infrared communication device, which can exchange the test data, is determined to be in a position in which the infrared communication device is communicable via an infrared communication. When two or more infrared communication devices can exchange the test data, the test (negotiation) is repeated to select one of the infrared communication devices, which has the highest number of successful exchanges of the test data. Similarly, the communication control unit 13 of the hydrogen station 1 detects one of the multiple infrared communication devices 11a, 11b, and the like, which is in a position in which the one device is communicable via an infrared communication. In the state shown in FIG. 1, only the communication channel 17a among the multiple communication channels 17a, 17b, and the like is connected with the communication control unit 13, and only the infrared communication device 11a among the multiple infrared communication devices 11a, 11b, and the like is activated.

The communication control unit 33 of the vehicle 3 transmits the vehicle tank temperature and the vehicle tank pressure via an infrared communication using the one of the multiple infrared communication devices 25a, 25b, and the like, which is determined to be in a position in which the one device is capable of performing an infrared communication. The communication control unit 13 of the hydrogen station 1 receives the vehicle tank temperature and the vehicle tank pressure transmitted using the one of the multiple infrared communication, devices 25a, 25b, and the like, which is determined to be in a position in which the one device is capable of performing an infrared communication. The communication control unit 13 outputs the received vehicle tank temperature and the received vehicle tank pressure to the charging control unit 15.

4. Effect of Present Embodiment

In the present embodiment, an infrared communication, which is high in directivity, is used. Therefore, even when, for example, multiple vehicles 3 are close to the hydrogen station 1, interference can be restricted in the infrared communication, dissimilarly to a communication using an electric wave.

Further, in the present embodiment, even when the rotation phase of the charging nozzle 9 connecting with the receptacle 23 changes, an infrared communication can be regularly maintained. Therefore, when the charging nozzle 9 is connected to the receptacle 23, the rotation phase of the charging nozzle 9 need not be adjusted, and thereby an infrared communication can be easily performed.

Further, in the present embodiment, the rotation phase of the charging nozzle 9 need not be fixed at a specific phase when being connected with the receptacle 23. Therefore, a mechanism for adjusting the rotation phase of the charging nozzle 9 at a specific phase need not be provided. Therefore, the structure of the charging nozzle 9 and the receptacle 23 can be simplified, compared with a structure including such a mechanism for adjusting the rotation phase. Thus, a manufacturing cost of the infrared communication system can be reduced.

In addition, in a case where such a mechanism is provided to fix the rotation phase of the charging nozzle 9 at a specific phase when being connected with the receptacle 23, each of the receptacle 23 and the charging nozzle 9 need to conform to a specific standard. When a standard, which the receptacle 23 conforms, is different from a standard, which the charging nozzle 9 conforms, the charging nozzle 9 cannot be connected to the receptacle 23. On the contrary, according to the present embodiment, the rotation phase of the charging nozzle 9 need not be adjusted at a specific phase when connecting with the receptacle 23. Therefore, such a problem of connection can be avoided.

5. Modification

Figure 3:
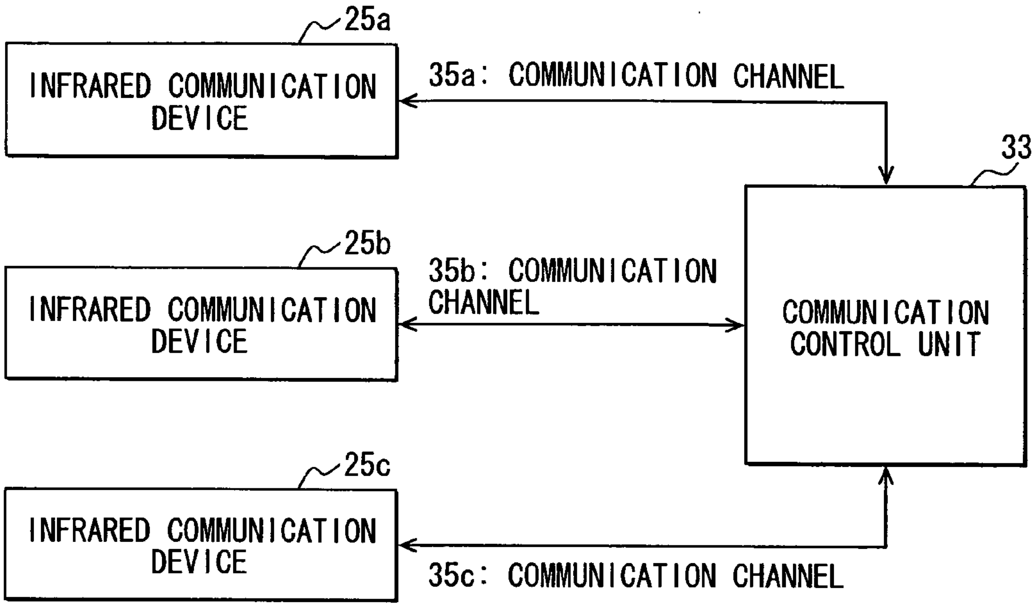
FIG. 3 is a block diagram showing another embodiment of a communication control unit of an infrared communication system.

As shown in FIG. 3, the communication control unit 33 of the vehicle 3 may be configured of a microcomputer. In this case, a software function of the microcomputer of the communication control unit 33 can be used for determining the one of the multiple infrared communication devices 25*a*, 25*b*, and the like, which is in a position to be capable of an infrared communication. Compared with a configuration of a hardware described above, the present communication control unit 33 configured of a microcomputer need not an additional custom IC. In addition, development of a new IC is unnecessary, and a mounting area of the communication control unit 33 can be restricted. Similarly, the communication control unit 13 of the hydrogen station 1 may be configured of a microcomputer. The present invention is not limited to the above embodiment and may be practiced in various modes within a scope of the present invention. For example, only the vehicle 3 may have multiple infrared communication devices, and the hydrogen station 1 may have a single element of an infrared communication device. Alternatively, only the hydrogen station 1 may have multiple infrared communication devices, and the vehicle 3 may have a single element of an infrared communication device. The multiple infrared communication devices 25*a*, 25*b*, and the like may be configured to transmit only an infrared ray and may be configured to transmit and receive an infrared ray. The multiple infrared communication devices 11*a*, 11*b*, and the like may be configured to transmit only an infrared ray and may be configured to transmit and receive an infrared ray.

Summarizing the above embodiments, the infrared communication system is configured to perform an infrared communication between a movable object having a connection port and a supply facility for supplying fluid to the movable object through a feed pipe connectable with the connection port. The movable object includes a movable-object-side infrared communication device. The supply facility includes a supply-facility-side infrared communication device at the feed pipe. The supply-facility-side infrared communication device is located in a position in the feed pipe such that the supply-facility-side infrared communication device is communicable with the movable-object-side infrared communication device via an infrared communication when the feed pipe is connected to the connection port. Specifically, for example, the supply-facility-side infrared communication device is located in a position where an optic axis of the movable-object-side infrared communication device substantially coincides with an optic axis of the supply-facility-side infrared communication device when the feed pipe is connected to the connection port.

A portion of the feed pipe, such as a nozzle, connected to the connection port is in a phase (rotation phase of the feed pipe), which is variable around an axial direction when the feed pipe is connected to the connection port. At least one of the movable-object-side infrared communication device and the supply-facility-side infrared communication device includes multiple infrared communication elements. At least one of the multiple infrared communication elements is in a position in which the one element is communicable with the other infrared communication device via an infrared communication, regardless of the rotation phase of the feed pipe. When the one of the multiple infrared communication elements is included in the movable-object-side infrared communication device, the other infrared communication device is included in the supply-facility-side infrared communication device. Alternatively, when the one of the multiple infrared communication element is the supply-facility-side infrared communication device, the other infrared communication device is included in the movable-object-side infrared communication device.

In the infrared communication system, an infrared communication, which is high in directivity, is used. Therefore, even when, for example, multiple movable objects are close to the supply facility, interference can be restricted in the infrared communication, dissimilarly to a communication using an electric wave.

Further, in the infrared communication system, even when the rotation phase of the feed pipe changes when connecting with the connection port, an infrared communication can be regularly enabled. Therefore, when the feed pipe is connected to the connection port, the rotation phase of the feed pipe need not be adjusted, and thereby an infrared communication can be easily performed.

Further, in the infrared communication system, the rotation phase of the feed pipe need not be fixed at a specific phase when being connected with the connection port. Therefore, a mechanism for adjusting the rotation phase of the feed pipe at a specific phase need not be provided. Therefore, the structure of the infrared communication system can be simplified, compared with a structure including such a mechanism for adjusting the rotation phase. Thus, a manufacturing cost of the infrared communication system can be reduced.

In addition, in a case where such a mechanism is provided to fix the rotation phase of the feed pipe at a specific phase when being connected with the connection port, each of the connection port and the feed pipe need to conform to a specific standard. When a standard, which the connection, port conforms, is different from a standard, which the feed pipe conforms, the feed pipe cannot be connected to the connection port. On the contrary, according to the present embodiment, the rotation phase of the feed pipe need not be adjusted at a specific phase when connecting with the connection port. Therefore, such a problem of connection can be avoided.

For example, in the infrared communication system, the movable object may include a single element of the movable-object-side infrared communication device, and the feed pipe of the supply facility may include multiple supply-facility-side infrared communication elements. In this case, one of the multiple supply-facility-side infrared communication elements is in a position in which the one element is communicable with the movable-object-side infrared communication device via an infrared communication when the feed pipe is connected to the connection port. When the rotation phase of the feed pipe changes, another one of the multiple supply-facility-side infrared communication elements moves to a position in which the other one element is communicable with the movable-object-side infrared communication device via an infrared communication. That is, at least one of the multiple supply-facility-side infrared communication elements is in a position in which the at least one element is communicable with the movable-object-side infrared communication device via an infrared communication in substantially any rotation phase of the feed pipe.

For example, in the infrared communication system, the movable object may include multiple movable-object-side infrared communication elements, and the feed pipe of the supply facility may include a single element of the supply-facility-side infrared communication device. In this case, one of the multiple movable-object-side infrared communication elements is in a position in which the one element is communicable with the supply-facility-side infrared communication device via an infrared communication when the feed pipe is connected to the connection port. When the rotation phase of the feed pipe changes, another one of the multiple movable-object-side infrared communication elements moves to a position in which the other one element is communicable with the supply-facility-side infrared communication device via an infrared communication. That is, at least one of the multiple movable-object-side infrared communication elements is in a position in which the at least one element is communicable with the supply-facility-side infrared communication device via an infrared communication in substantially any rotation phase of the feed pipe.

For example, in the infrared communication system, the movable object may include multiple movable-object-side infrared communication elements, and the feed pipe of the supply facility may include multiple the supply-facility-side infrared communication elements. In the present structure, at least one of the multiple movable-object-side infrared communication elements is in a position in which the at lest one element is communicable with at least one of the multiple the supply-facility-side infrared communication elements via an infrared communication, regardless of the rotation phase of the feed pipe when the feed pipe is connected to the connection port.

In the infrared communication system, for example, when the movable object includes the multiple movable-object-side infrared communication elements, the movable object may include a detection unit configured to detect one of the multiple movable-object-side infrared communication elements, which is in a position in which the one element is communicable with the supply-facility-side infrared communication device via an infrared communication.

Alternatively, in the infrared communication system, for example, when the supply facility (supply pipe) includes the multiple supply-facility-side infrared communication elements, the supply facility may include a detection unit configured to detect one of the multiple supply-facility-side infrared communication elements, which is in a position in which the one element is communicable with the movable-object-side infrared communication device via an infrared communication.

In the present structure, an infrared communication can be smoothly performed using the one of the movable-object-side infrared communication elements or the one of the supply-facility-side infrared communication elements detected by the detection unit.

The detection unit may be configured to performs, for example, a negotiation. Specifically, test data may be exchanged in a condition where only one of the multiple infrared communication elements is activated. The exchange of test data is repeated, while the one activated infrared communication element is switched. Consequently, the infrared communication element, which can exchange the test data, is determined to be in a position in which the infrared communication element is communicable via an infrared communication. For example, when two or more infrared communication elements can exchange the test data, the test (negotiation) may be repeated to select one of the infrared communication elements, which has the highest number of successful exchanges of the test data.

In another way, for example, the detection unit may have software for detecting one infrared communication element, which actually completes successful exchange of test data in a state where all the multiple infrared communication elements are activated.

The connection port may be, for example, a hole provided in the movable object. The connection port may be, for example, a circular hole when viewed from its front side. The feed pipe may have, for example, a tip end having a nozzle configured to be inserted in the hole. The nozzle may have, for example, a circular cross section perpendicular to its axial direction. In this case, the feed pipe can be connected with the connection port (hole) by inserting the nozzle of the feed pipe into the hole of the movable object. When the difference between the diameter of the hole of the movable object and the outer diameter of the nozzle is set to be sufficiently small, the position of the nozzle inserted in the hole of the movable object and the axial direction of the nozzle can be uniquely determined at a specific position and a specific direction respectively. The rotation phase of the nozzle inserted in the hole of the movable object is variable.

For example, one of the movable-object-side infrared communication device and the supply-facility-side infrared communication device may be configured only to transmit an infrared ray, and the other of the movable-object-side infrared communication device and the supply-facility-side infrared communication device may be configured only to receive an infrared ray. Alternatively, for example, both the movable-object-side infrared communication device and the supply-facility-side infrared communication device may be configured to transmit and receive an infrared ray.

The movable object may be, for example, a vehicle, a vessel, an airplane, and the like. The vehicle may be, for example, a passenger car, a track, a two-wheeled vehicle, a railway car, and the like. A state of the fluid may be, for example, liquid or gas. The fluid may be various fuel. Specifically, the fluid may be, for example, hydrogen, gasoline, heavy oil, light oil, liquefied petroleum gas (LPG), alcohol such as ethanol, and the like.

In the infrared communication system, the movable object and the supply facility may exchange, for example, information specifying a state of a tank of the movable object for receiving fluid, identification information specifying the movable object and the supply facility, and the like. The state of the tank of the movable object may include a temperature of the fluid, a pressure of the fluid, a charged amount of the fluid, and/or the like.

The above processings such as calculations and determinations are not limited being executed by the control system 7, the hydrogen charging control ECU 21, and the like. The control unit may have various structures including the control system 7, the hydrogen charging control ECU 21, and the like shown as an example.

The above processings such as calculations and determinations may be performed by any one or any combinations of software, an electric circuit, a mechanical device, and the like. The software may be stored in a storage medium, and may be transmitted via a transmission device such as a network device. The electric circuit may be an integrated circuit, and may be a discrete circuit such as a hardware logic configured with electric or electronic elements or the like. The elements producing the above processings may be discrete elements and may be partially or entirely integrated.

It should be appreciated that while the processes of the embodiments of the present invention have been described herein as including a specific sequence of steps, further alternative embodiments including various other sequences of these steps and/or additional steps not disclosed herein are intended to be within the steps of the present invention.

Various modifications and alternations may be diversely made to the above embodiments without departing from the spirit of the present invention.

What is claimed is:

1. An infrared communication system configured to perform an infrared communication between a movable object having a connection port and a supply facility for supplying fluid to the movable object through a feed pipe connectable with the connection port, the infrared communication system comprising:

a movable-object-side infrared communication device provided to the movable object; and a supply-facility-side infrared communication device provided to the feed pipe of the supply facility and configured to be located in a position in which the supply-facility-side infrared communication device is capable of communicating with the movable-object-side infrared communication device via an infrared communication when a feed connector of the feed pipe is connected with the connection port, wherein a rotation phase of the feed connector of the feed pipe is variable around an axial direction when the feed pipe is connected with the connection port, at least one of the movable-object-side infrared communication device and the supply-facility-side infrared communication device includes a plurality of infrared communication elements, at least one of the plurality of infrared communication elements is in a communicable position in which the at least one of the plurality of infrared communication elements is capable of performing the infrared communication, regardless of the rotation phase, at least one of the movable-object-side infrared communication device and the supply-facility-side infrared communication device includes:

a switching unit configured to activate at least one of the plurality of infrared communication elements;

a selection unit configured to select at least one of the plurality of infrared communication elements which makes a highest successful infrared communication when activated; and a communication unit configured to perform an infrared communication via the selected at least one of the plurality of infrared communication elements.

2. The infrared communication system according to claim 1, wherein at least one of the movable object and the supply facility includes a detection unit configured to detect the at least one of the plurality of infrared communication elements in the communicable position.

3. The infrared communication system according to claim 1, wherein the connection port is a hole, and the feed connector is a nozzle configured to be inserted in the hole.

4. The infrared communication system according to claim 1, wherein the movable object is one of a vehicle, a vessel, and an airplane, and the fluid is one of liquid fuel and gaseous fuel.

5. The movable object of the infrared communication system according to claim 1, wherein the movable object includes the plurality of infrared communication elements located around the connection port.

6. The supply facility of the infrared communication system according to claim 1, wherein the supply facility includes the plurality of infrared communication elements located in a portion of the feed pipe opposed to the movable object when the feed pipe is connected with the connection port.

7. The infrared communication system according to claim 1, wherein the at least one of the infrared communication elements, which makes the highest successful infrared communication, has a highest number of successful exchanges of data.

8. The infrared communication system according to claim 1, wherein the switching unit individually activates each of the plurality of infrared communication elements.

9. A method for performing an infrared communication between a movable object and a supply facility, the supply facility being for supplying fluid to the movable object through a feed pipe of the supply facility, the feed pipe being connectable with a connection port of the movable object, a rotation phase of a feed connector of the feed pipe being variable around its axis when the feed pipe is connected with the connection port, the method comprising:

activating at least one of a plurality of infrared communication elements, which is provided to one of the feed connector of the feed pipe and the movable object, when the feed pipe is connected with the connection port;

selecting at least one of the plurality of infrared communication elements, which makes a highest successful infrared communication when activated, when the feed pipe is connected with the connection port; and performing an infrared communication via the selected at least one of the plurality of infrared communication elements when the feed pipe is connected with the connection port, regardless of the rotation phase.

10. The method according to claim 9, wherein the at least one of the infrared communication elements, which makes the highest successful infrared communication, has a highest number of successful exchanges of data.

11. The method according to claim 9, wherein the step of activating individually activates each of the plurality of infrared communication elements.

* * * * *